United States Patent
Harsila et al.

(10) Patent No.: US 12,188,765 B2
(45) Date of Patent: Jan. 7, 2025

(54) ADJUSTABLE UPDATE RATE FOR MEASURING PROBE

(71) Applicant: Mitutoyo Corporation, Kanagawa-ken (JP)

(72) Inventors: Scott Allen Harsila, Shoreline, WA (US); Bjorn Erik Bertil Jansson, Snohomish, WA (US); Hiroyuki Kanamori, Kawasaki (JP)

(73) Assignee: Mitutoyo Corporation, Kanagawa-ken (JP)

( * ) Notice: Subject to any disclaimer, the term of this patent is extended or adjusted under 35 U.S.C. 154(b) by 323 days.

(21) Appl. No.: 17/939,710

(22) Filed: Sep. 7, 2022

(65) Prior Publication Data

US 2024/0077296 A1   Mar. 7, 2024

(51) Int. Cl.
*G01B 5/008* (2006.01)
*G01B 5/016* (2006.01)

(52) U.S. Cl.
CPC .................... *G01B 5/016* (2013.01)

(58) Field of Classification Search
CPC ......... G01B 5/008; G01B 5/012; G01B 5/016
USPC ........................................................... 33/503
See application file for complete search history.

(56) References Cited

U.S. PATENT DOCUMENTS

| | | | | |
|---|---|---|---|---|
| 5,279,042 A * | 1/1994 | Gonzalez | ............... | G01B 7/002 455/67.14 |
| 5,755,038 A | 5/1998 | McMurtry | | |
| 6,806,968 B2 * | 10/2004 | Ruck | ....................... | H04L 69/28 356/3.06 |
| 7,792,654 B2 | 9/2010 | Prestidge et al. | | |
| 7,866,056 B2 * | 1/2011 | Ould | .................... | G01B 21/042 33/503 |
| 8,474,148 B2 | 7/2013 | Jonas et al. | | |
| 10,145,666 B2 | 12/2018 | Jansson | | |
| 10,184,773 B2 | 1/2019 | Jansson | | |
| 10,415,949 B2 | 9/2019 | Koga et al. | | |
| 10,663,275 B2 * | 5/2020 | Bather | ............... | G05B 19/4099 |

(Continued)

FOREIGN PATENT DOCUMENTS

EP          3748282 A1    12/2020

OTHER PUBLICATIONS

Extended European Search Report, dated Jan. 18, 2024, for corresponding European Patent Application No. 23194344.0. (7 pages).

*Primary Examiner* — George B Bennett
(74) *Attorney, Agent, or Firm* — Seed IP Law Group LLP

(57) ABSTRACT

A measuring system includes a measuring probe with a contact portion that contacts a workpiece to be measured. The measuring probe operates with a first update rate during at least part of a moving mode, wherein the moving mode includes movement of the measuring probe such that the contact portion is moved away from the workpiece and/or is moved at a distance from the workpiece that is equal to or greater than a threshold distance. The measuring probe operates with a second update rate (i.e., which is faster than the first update rate) during at least part of a measuring mode, wherein the measuring mode includes movement of the measuring probe such that the contact portion is moved toward the workpiece for obtaining a measurement. In various implementations, the combined use of the first and second update rates effectively reduces power-on drift of the measuring probe.

20 Claims, 8 Drawing Sheets

(56) References Cited

U.S. PATENT DOCUMENTS

| | | |
|---|---|---|
| 10,852,119 B2 | 12/2020 | Harsila et al. |
| 11,047,678 B2 | 6/2021 | Koga et al. |
| 11,268,874 B2 | 3/2022 | Saito et al. |
| 11,619,482 B1 * | 4/2023 | Lillya .................... G01B 5/008 |
| | | 702/168 |
| 11,846,497 B2 * | 12/2023 | Ould ....................... G01P 15/18 |
| 11,860,602 B2 * | 1/2024 | Yu .......................... G01B 5/008 |
| 2017/0350683 A1 * | 12/2017 | Bather ..................... F01D 9/02 |
| 2017/0370689 A1 | 12/2017 | Hemmings et al. |
| 2018/0266817 A1 * | 9/2018 | Kashiwabuchi ....... G01B 5/008 |
| 2021/0207938 A1 | 7/2021 | Ould et al. |
| 2024/0012143 A1 * | 1/2024 | Weston ................. G01S 7/4866 |

* cited by examiner

ADJUSTABLE UPDATE RATE FOR MEASURING PROBE

BACKGROUND

Technical Field

This disclosure relates to measuring probes for coordinate measuring machines, and more particularly to update rates for measuring probes.

Description of the Related Art

A measuring probe for a coordinate measurement machine (CMM) is described in U.S. Pat. No. 10,415,949, which is hereby incorporated herein by reference in its entirety. Such a measuring probe includes: a stylus having a contact portion to be in contact with a workpiece to be measured; a probe housing capable of supporting the stylus on an axial center; a detection element capable of detecting a movement of the contact portion as corresponding to a contact with a workpiece; and a signal processing circuit for processing an output of the detection element. The signal processing circuit processes a sensor signal from the detection element to output a measurement signal (e.g., a touch signal). Another CMM measuring probe with similar components (e.g., and capable of outputting digital measurement signals) is described in U.S. Pat. No. 10,852,119, which is hereby incorporated herein by reference in its entirety.

During operation, such CMM measuring probes may experience "power-on" drift (aka, turn-on drift, warm-up drift), where the probe's measuring output will monotonically change over time due to electrical power dissipation (heat) until the temperature of the probe is stable, and the probe reaches thermal equilibrium with the ambient environment. Power-on drift may cause errors in position measurements during the warm-up period, due to probe material expansion, for which it may be required to wait for the measuring probe to be thermally stable, if highly accurate measurements are to be achieved.

To counteract this problem, it is known to allow a CMM to provide power to a measuring probe attached to the CMM during a warmup period, to enable the measuring probe to reach a steady state of temperature before beginning workpiece surface measurements. This can be time consuming and undesirable for various types of measurement operations (e.g., when attempting to perform measurement operations within a certain time period, when performing measurement operations that require the use of multiple CMM measuring probes, etc.). Therefore, some means exist for expediting or avoiding a warmup period. For example, a CMM probe or a CMM probe head supporting the CMM probe may include a heat regulator configured to quickly raise a temperature of the CMM probe to a desired steady state. U.S. Pat. No. 8,474,148 discloses a heater configured to provide heat inside of a CMM probe head.

Systems and configurations that may improve or otherwise enhance such CMM measuring probes (e.g., in relation to improved operating characteristics, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A measuring system is provided including at least a measuring probe with a stylus, at least one detection element, and a signal processing portion. The stylus has a contact portion to be in contact with a workpiece to be measured. The at least one detection element is capable of detecting a movement of the contact portion as corresponding to a contact with a workpiece. The signal processing portion is configured to process a generated signal obtained from an output of the at least one detection element to output a measurement signal.

The measuring probe is configured to operate with a first update rate during at least part of a moving mode, wherein the moving mode comprises at least one of a movement of the measuring probe such that the contact portion is moved away from the workpiece or a movement of the measuring probe such that the contact portion is moved at a distance from the workpiece that is equal to or greater than a threshold distance. The measuring probe is further configured to operate with a second update rate during at least part of a measuring mode, wherein the measuring mode comprises a movement of the measuring probe such that the contact portion is moved toward the workpiece for obtaining a measurement, and the second update rate is faster than the first update rate.

In various implementations, the first and second update rates correspond to rates at which the signal processing portion processes/outputs measurement signals. In various implementations, the moving mode and the measuring mode correspond to modes of a coordinate measuring machine (e.g., which operates to move the measuring probe including the contact portion in relation to the workpiece). In various implementations, the measuring system further includes a controller portion which provides a signal (e.g., sends a command) which indicates that the measuring probe is to switch between the update rates.

In accordance with principles disclosed herein, in various implementations the magnitude of power-on drift of the measuring probe (e.g., in comparison to previously known configurations) may be reduced by actively switching the update rate of the measuring probe between the relatively slower first update rate and the relatively faster second update rate. Utilization of the slower update rate for certain periods of time may effectively decrease the overall electrical power dissipated in the measuring probe (e.g., while still enabling detection of collisions during the moving mode, etc.), effectively lowering the duty cycle of the electronics and correspondingly reducing the magnitude of the power-on drift of the measuring probe.

DETAILED DESCRIPTION

Figure 1:
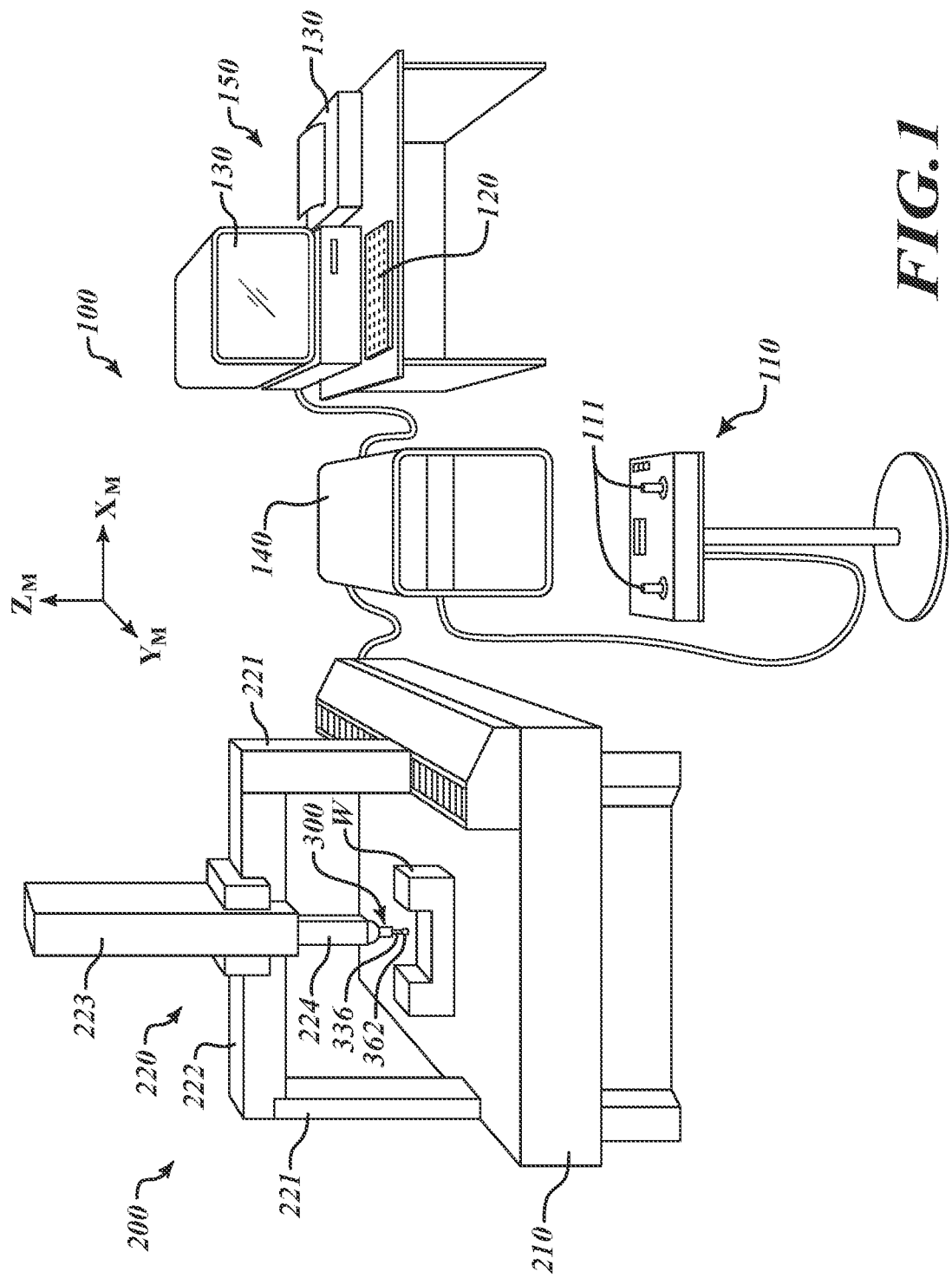
FIG. 1 is a schematic diagram illustrating an example of a measuring system using a measuring probe according to a first embodiment of the present invention.

FIG. 1 is a schematic diagram illustrating an example of a measuring system 100 using a measuring probe 300. As illustrated in FIG. 1, the measuring system 100 includes: the measuring probe 300; a coordinate measuring machine 200 configured to move the measuring probe 300; an operation portion 110 having manually-operated joysticks 111; and a system controller portion 140 configured to control certain operations of the coordinate measuring machine 200 and the measuring probe 300. The measuring system 100 also includes: a host computer 150 configured to operate the coordinate measuring machine 200 via the system controller portion 140 and process measurement data acquired by the coordinate measuring machine 200 to obtain, for example, dimensions or a shape of a workpiece W to be measured; one or more input units 120 (e.g., a keyboard, mouse, etc.) configured to input, for example, measurement conditions; and one or more output units 130 (e.g., a display, printer, etc.) configured to output, for example, measured results. As will be described in more detail below with respect to FIG. 2, the measuring probe 300 includes a stylus 336 having a contact portion 362 to be in contact with the workpiece W to be measured.

As illustrated in FIG. 1, the coordinate measuring machine 200 includes: a surface plate 210; a drive mechanism 220 which is provided to stand on the surface plate 210 and configured to move the measuring probe 300 three-dimensionally; and a drive sensor (not illustrated) configured to detect a drive amount of the drive mechanism 220. The drive mechanism 220 includes X axis, Y axis, and Z axis movement mechanisms 222, 221, and 223 (e.g., slide mechanisms), respectively, for moving the measuring probe 300 three-dimensionally.

Figure 2:
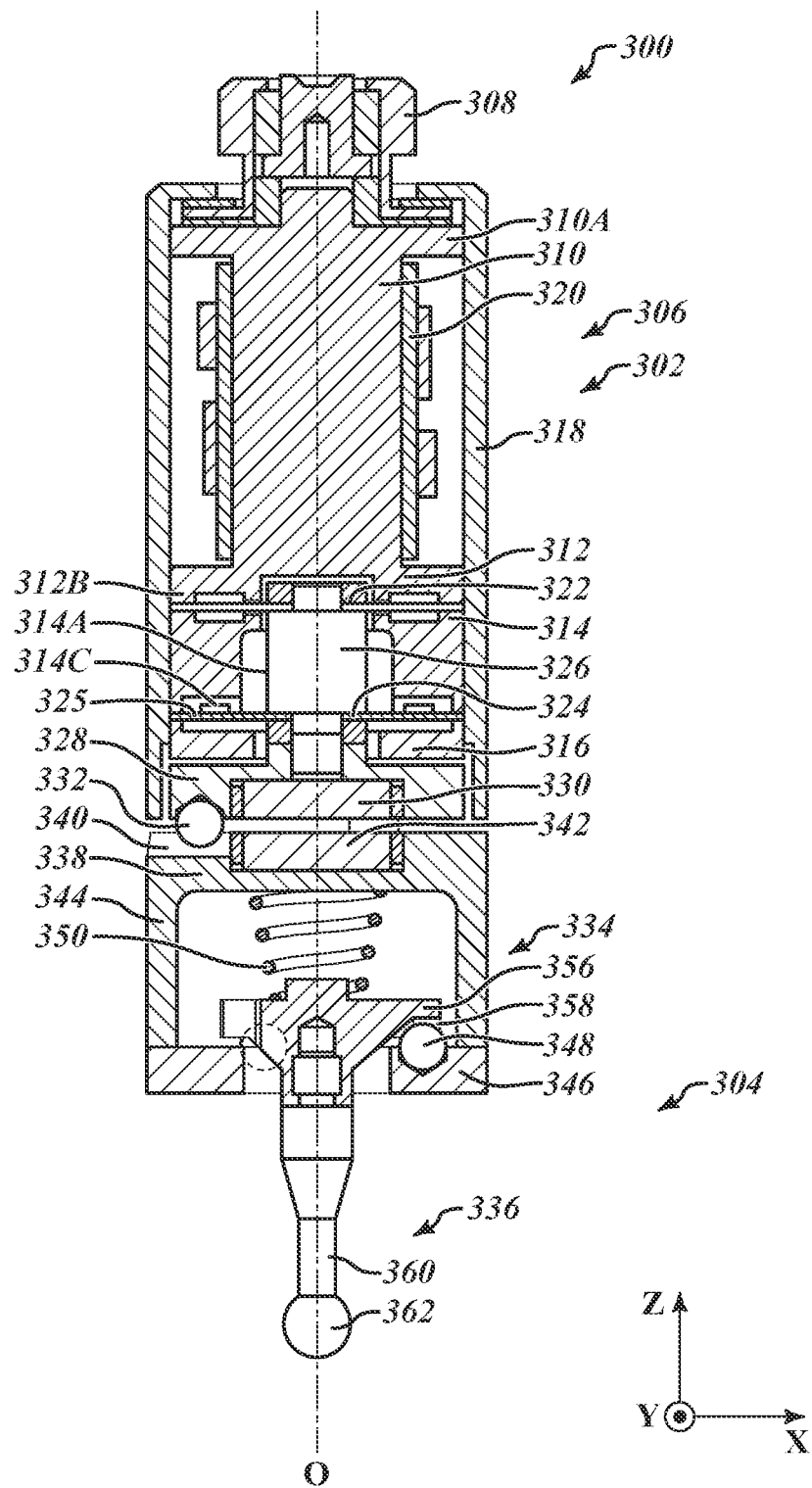
FIG. 2 is a schematic diagram illustrating a cross-section of the measuring probe of FIG. 1.

FIG. 2 is a schematic diagram illustrating a cross-section of the measuring probe 300 of FIG. 1. As illustrated in FIG. 2, the measuring probe 300 includes: the stylus 336 having the contact portion 362 to be in contact with the workpiece W to be measured; a probe housing 306 configured to be capable of supporting the stylus 336 on an axial center O; one or more (e.g., four in the present embodiment) detection elements 325 configured to be capable of detecting movements of the contact portion 362 deviating from the axial center O and along the axial center O; and a signal processing circuit 320 configured to process outputs of the four detection elements 325 to output a measurement signal Str (e.g., a touch signal), which may be a digital signal. Specifically, the measuring probe 300 is referred to also as a touch signal probe. Note that the stylus 336 is included in a stylus module 304, and the probe housing 306 and the detection elements 325 are included in a probe main body 302. The probe main body 302 is supported by a spindle 224 of the drive mechanism 220. The stylus module 304 is detachably coupled to the probe main body 302 with high positional reproducibility via a kinematic joint.

For the purpose of the following description, the longitudinal direction on the plane of paper in FIG. 2 is defined as a Z-direction, the horizontal direction on the plane of paper is defined as an X-direction, and the vertical direction to the plane of paper is defined as a Y-direction. The direction of the axial center O (axial direction O) of the measuring probe 300 therefore coincides with the Z-direction.

As illustrated in FIG. 2, the probe main body 302 includes the probe housing 306, the signal processing circuit 320, supporting members (supporters) 322 and 324, the detection elements 325, a coupling shaft 326, a flange member 328, a permanent magnet 330, and balls 332. The probe housing 306 includes an attachment portion 308, a circuit placement portion 310, a fixing member 314, a bottom member 316, and a main body cover 318.

As illustrated in FIG. 2, the attachment portion 308 is a portion to be attached to the spindle 224 at the upper end portion of the measuring probe 300. The circuit placement portion 310 is disposed at a lower end of the attachment portion 308. A cross-section of the circuit placement portion 310 perpendicular to the axial center O has a generally triangular shape except for a disc-shaped upper end portion 310A and a disc-shaped lower flange 312 provided at a lower end of the circuit placement portion 310. The signal processing circuit 320 is disposed on the outer periphery of the generally triangular shape. The circuit placement portion 310 is disposed above the supporting members 322 and 324.

As illustrated in FIG. 2, the fixing member 314 is fixed to a lower end peripheral portion 312B of the lower flange 312 with the supporting member 322 interposed therebetween. The fixing member 314 has a cylindrical shape provided with an opening 314A on the axial center O. A lower end inner surface of the fixing member 314 is provided with four recesses 314C at fourfold symmetry positions. The bottom member 316 is fixed to a lower end peripheral portion of the fixing member 314 with the supporting member 324 interposed therebetween. The bottom member 316 has an annular shape. The main body cover 318 has a cylindrical shape and is disposed around the circuit placement portion 310, the lower flange 312, the fixing member 314, and the bottom member 316 in such a manner as to cover all of the signal processing circuit 320. The main body cover 318 is fixed to the fixing member 314 with bolts.

Figure 3:
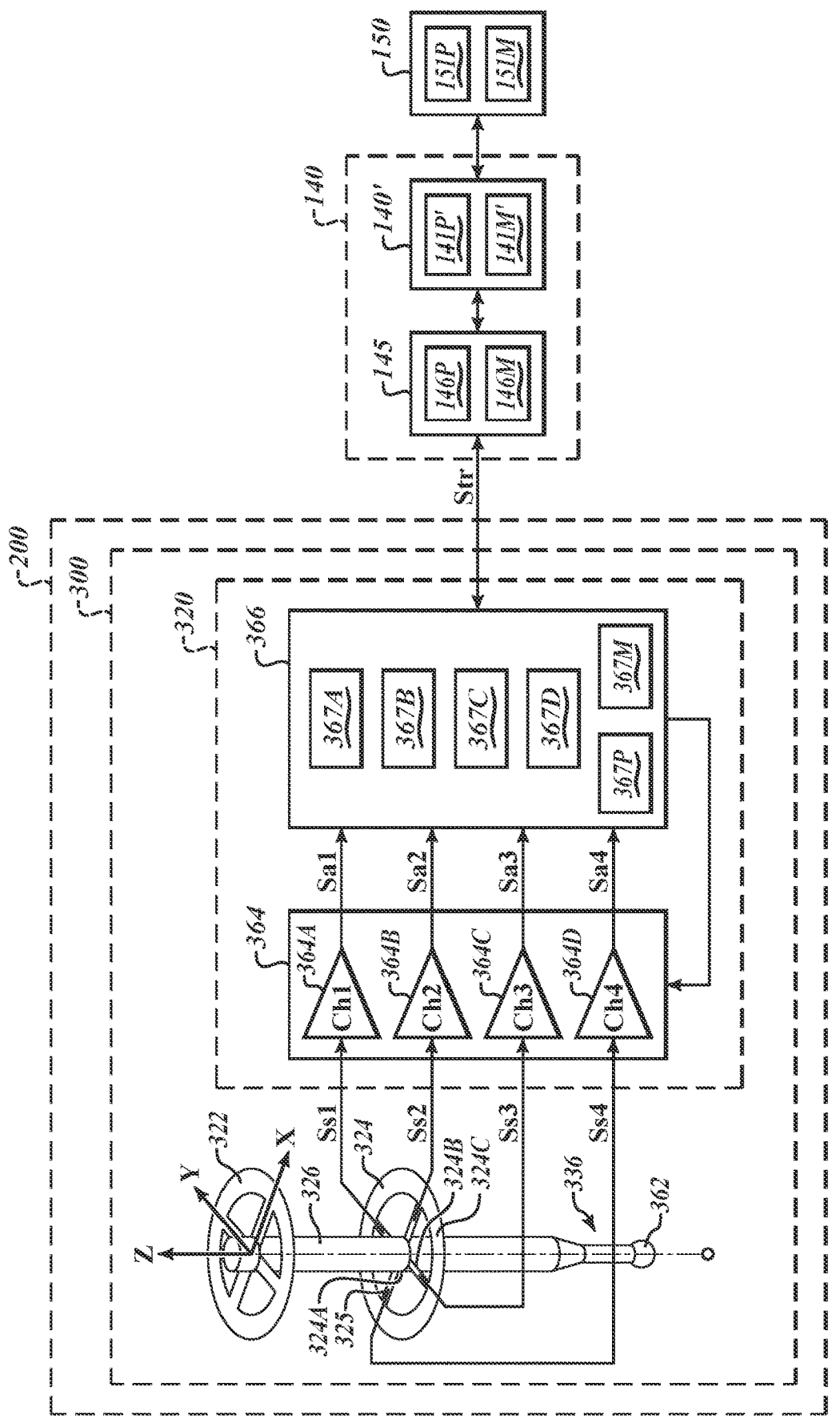
FIG. 3 is a block diagram illustrating certain portions of the measuring system of FIG. 1.

FIG. 3 is a block diagram illustrating certain portions of the measuring system 100 of FIG. 1. As illustrated in FIG. 3, the signal processing circuit 320 is a circuit configured to process outputs of the detection elements 325 to output the measurement signal Str (e.g., touch signal/contact sensing signal for notifying when the contact portion 362 is in contact with the workpiece W to be measured). The signal processing circuit 320 includes a signal amplifying portion (a signal amplifying circuit) 364 and a signal processing portion 366 (e.g., including a signal processing device).

The signal amplifying portion 364 includes amplifiers 364A to 364D configured to amplify respective sensor signals Ss (Ss1 to Ss4), which are the outputs of the detection elements 325, to output amplified signals Sa (Sa1 to Sa4), respectively. Note that reference signs Ch1 to Ch4 denote channels 1 to 4, respectively. The signal processing portion 366 processes the amplified signals Sa to output the measurement signal Str. That is, the signal amplifying portion 364 configured to amplify the respective outputs of the detection elements 325 is provided before the signal processing portion 366 in the present embodiment, and generated signals Sg (Sg1 to Sg4) are the amplified signals Sa of the signal amplifying portion 364.

The signal processing portion 366 is configured to process the generated signals Sg obtained from the outputs of the four detection elements 325 so as to output the measurement signal Str. The signal processing portion 366 is configured to obtain/determine movement/deflection amounts in the three X-, Y-, and Z-directions from the generated signals Sg (Sg1 to Sg4), synthesize the movement/deflection amounts in the three directions, and output the measurement signal Str which may indicate when the contact portion 362 moves a given displacement or more (e.g., as corresponding to a contact with a workpiece). Note that a bridge circuit may be formed in the signal amplifying part, or a bridge circuit may be formed in the signal processing part. Additional operations of the signal processing portion 366, as well as the system controller portion 140 and host computer 150, will be described in more detail below.

As illustrated in FIG. 2, the supporting members 322 and 324 are elastically-deformable members disposed in the axial direction O of the probe housing 306 and allowing for orientation changes of the stylus 336. Specifically, the supporting member 324 has a rotationally symmetric shape including a total of four deformable arm parts 324B (e.g., four deformable arms) at positions displaced from each other by an angle of 90 degrees in a circumferential direction (around the axial center O) as illustrated in FIG. 3. These four arm parts 324B are formed on the same plane. The supporting members 322 and 324 have the same thickness and the same structure except for widths of the respective arm parts. Without being limited thereto, the thicknesses, lengths, and shapes of the arm parts may be different from each other, or the entire supporting members 322 and 324 may have shapes different from each other. Thus, the supporting member 324 in which the detection elements 325 are disposed will be described below, and any overlapping description of the supporting member 322 will be omitted. Note that the shape of the supporting members is not limited to that shown in the present embodiment, and it is only necessary that at least one supporting member be provided.

As illustrated in FIG. 3, the supporting member 324 has a generally circular plate shape, and includes, in addition to the rectangular arm parts 324B, a central portion 324A to be connected to the coupling shaft 326, and a peripheral portion 324C that is coupled to the central portion 324A by the arm parts 324B and that is connected to the probe housing 306. The peripheral portion 324C is located at the outermost position of the supporting member 324. The arm parts 324B are disposed on an inner side of the peripheral portion 324C in such a manner as to extend linearly in a radial direction. The central portion 324A is disposed on an inner side of the arm parts 324B. The supporting member 324 is configured such that a displacement of the coupling shaft 326 with respect to the probe housing 306 causes the central portion 324A to move up, down, left, or right and thereby causes the arm parts 324B to be elastically deformed accordingly (e.g., as corresponding to a contact of the contact portion 362 with a workpiece, etc.)

The detection elements 325 are, for example, strain gauges to be affixed and detect a strain of the supporting member 324 in which the detection elements 325 are disposed as illustrated in FIG. 3. The four detection elements 325 are disposed at fourfold symmetry positions on the respective deformable arm parts 324B of the supporting member 324. The detection elements 325 are fixed to the arm parts 324B with an adhesive, for example. While a general-purpose strain gauge may be used, a temperature-compensated strain gauge may be used instead. Furthermore, from the standpoint of temperature compensation, temperature correction may be made by integrating a dummy strain gauge for temperature compensation into a bridge circuit (not illustrated), for example.

As illustrated in FIGS. 2 and 3, the coupling shaft 326 has a generally cylindrical shape, and couples the two supporting members 322 and 324 together. The coupling shaft 326 is held on the axial center O by the two supporting members 322 and 324 without being in contact with the lower flange 312, the fixing member 314, and the bottom member 316. The coupling shaft 326 integrally supports the flange member 328.

As illustrated in FIG. 2, the flange member 328 has a generally disc shape. The flange member 328 faces the bottom member 316 in the axial direction O in a non-contact manner and faces the main body cover 318 in the radial direction in a non-contact manner. The flange member 328 supports the stylus module 304. At least a portion of a gap between the bottom member 316 and the flange member 328 is filled with a viscous material such as a grease oil. The permanent magnet 330 is fixed, on the axial center O, to a lower surface of the flange member 328. In a lower end outer region of the flange member 328, the three balls 332 are disposed in a rotationally symmetric manner at an interval of 120 degrees in the circumferential direction so as to surround the permanent magnet 330.

As illustrated in FIG. 2, the stylus module 304 includes an over-travel mechanism 334, and the stylus 336 is supported by the over-travel mechanism 334. The over-travel mechanism 334 is a mechanism configured to change the position of the stylus 336 when a large force greater than a measuring force in outputting the measurement signal Str is applied to the stylus 336, and to automatically restore the position of the stylus 336 when such a large force disappears. Specifically, the over-travel mechanism 334 includes a flange portion 338, an extended portion 344, a stylus holder 346, and a coil spring 350.

As illustrated in FIG. 2, the flange portion 338 is a member corresponding to the flange member 328. That is, three V-grooves 340 are disposed at an interval of 120 degrees in the circumferential direction of the flange portion 338 so as to be in contact with the balls 332. A magnetic member 342, which may be a permanent magnet, to be attracted to the permanent magnet 330 is disposed in the flange portion 338 so as to face the permanent magnet 330. Specifically, the flange portion 338 and the flange member 328 constitute a kinematic joint, which is a detachable coupling mechanism.

As illustrated in FIG. 2, the extended portion 344 is integrally formed with a periphery of the flange portion 338 and houses therein the coil spring 350 expandable in the axial direction O. The stylus holder 346 is provided at an end of the extended portion 344 in the axial direction O and connected to the extended portion 344 (e.g., with bolts). The stylus holder 346 movably supports, at its upper surface closer to the coil spring 350, a flange portion 356 of the stylus 336 pressed by the coil spring 350. Three balls 348 are disposed on the upper surface of the stylus holder 346 closer to the coil spring 350 at an interval of 120 degrees in the circumferential direction. Three V-grooves 358 are disposed on a lower surface of the flange portion 356 at an interval of 120 degrees in the circumferential direction so as to correspond to the balls 348. Specifically, it can be said that the stylus holder 346 and the flange portion 356 constitute the aforementioned kinematic joint. Thus, the over-travel mechanism 334 can achieve high positioning reproducibility of the stylus 336 with respect to the flange portion 338 within the range of the measuring force not exceeding the pressing force of the coil spring 350.

As illustrated in FIG. 2, the stylus 336 includes: the flange portion 356 supported by the stylus holder 346 as described above; a rod portion 360 configured to extend from the flange portion 356 in the axial direction O; and the contact portion 362 provided at the tip of the rod portion 360. The base end of the rod portion 360 is attached to the flange portion 356. The spherical contact portion 362 to be in contact with the workpiece W to be measured is provided at the tip of the rod portion 360 (i.e., the stylus 336 has the contact portion 362 to be in contact with the workpiece W to be measured).

As illustrated in FIG. 3, the signal processing portion 366 includes a clock timer portion 367A, a compare value portion 367B, a switch settings portion 367C and an analog-to-digital (A-to-D) converter portion 367D, each of which will be described in more detail below. Briefly, in certain implementations, the clock timer portion 367A, compare value portion 367B and switch settings portion 367C may be utilized as part of a process for setting and/or implementing an update rate (e.g., as a first update rate, or a second update rate) of the measuring probe 300. The A-to-D converter portion 367D (e.g., including an A-to-D converter) may be utilized for performing A-to-D conversion as part of the processing for providing digital measurement signals Str (e.g., for which the processing may include converting the output amplified signals Sa1 to Sa4 to digital signals).

In various implementations, certain portions of the signal processing portion 366 may be merged and/or indistinguishable. For example, the clock timer 367A (e.g., including a clock) may in various implementations include the compare value portion 367B and/or the switch settings portion 367C. In various implementations, the signal processing portion 366 may also include certain additional portions. For example, as described in U.S. Pat. No. 10,852,119 (as previously incorporated herein), in various implementations the signal processing portion 366 may also include a signal combination processing portion, a trigger threshold processing portion, an offset compensation portion, etc.

In various implementations, the signal processing portion 366 may be implemented according to principles known to one skilled in the art of touch probe design. Therefore, it is only briefly described here in one exemplary implementation. According to certain design principles, it may be desirable for the signal processing portion 366 to combine a plurality of displacement sensor signals (e.g., corresponding to Sa1 to Sa4) in order to provide a combined signal (e.g., that may be compared to a touch trigger signal switching threshold). Thus, the signal processing portion 366 inputs the four amplified signals Sa1 to Sa4 (e.g., which may be offset compensated signals in certain implementations), which may be converted to digital signals by the A-to-D converter portion 367D. The signal processing portion 366 may determine a combined displacement signal, which may be compared to a switching threshold value. When the combined displacement signal exceeds the switching threshold value, the signal processing portion 366 may output a measurement signal Str that indicates that the contact portion 362 of the stylus 360 has contacted the workpiece (e.g., a touch signal).

The output of the measuring probe 300 (e.g., including the measurement signal Str) is provided to a system controller portion 140 (e.g., so that when a touch signal occurs, current measurement values may be recorded so as to indicate the present coordinates of the stylus and the measurement coordinates of a workpiece surface that it is contacting, such as in relation to an XYZ coordinate system of the CMM 200 or otherwise). The system controller portion 140 includes a probe interface controller portion 145 and a CMM controller portion 140'.

In one implementation, the probe interface controller portion 145 may receive and send signals from and to the signal processing portion 366 of the measuring probe 300 (e.g., including the measurement signals Str). In various implementations, the probe interface controller portion 145 may be provided in different configurations (e.g., as included within the system controller portion 140, or may be a separate element outside of the system controller portion 140, or may be merged with the CMM controller portion 140', etc.) The CMM controller portion 140' may receive and send signals from and to the probe interface controller portion 145.

In various implementations, the CMM controller portion 140' may provide or otherwise indicate the coordinates of the measuring probe 300 as corresponding to when a touch signal is produced. For example, such coordinates may be in accordance with XYZ coordinates (e.g., in a CMM coordinate system) as corresponding to the positioning of the measuring probe 300 by the X axis, Y axis, and Z axis movement mechanisms 222, 221, and 223 of the CMM 200. Such coordinates as corresponding to the position of the measuring probe 300 may be utilized to determine the measurement coordinates of a surface point on the workpiece that has been contacted by the contact portion 362 (i.e., for which the contact resulted in the touch signal and for which such measurement coordinates determinations may include factors such as the length of the stylus, etc.) A host computer 150 may receive and send signals from and to the CMM controller portion 140' of the system controller portion 140. In various implementations, the host computer 150 may be configured to operate and/or communicate with the coordinate measuring machine 200 via the system controller portion 140 and process measurement data (e.g., including coordinates) acquired by the coordinate measuring machine 200 to determine, for example, dimensions or a shape of a surface of the workpiece W being measured.

In various implementations, the signal processing portion 366 may include one or more processors 367P and a memory 367M, the probe interface controller portion 145 may include one or more processors 146P and a memory 146M, the CMM controller portion 140 may include one or more processors 141P' and a memory 141M', and the host computer 150 may include one or more processors 151P and a memory 151M. In various implementations, for each respective portion, the respective memory may be coupled to the respective one or more processors, and may store program instructions that when executed by the one or more processors cause the one or more processors to perform certain functions and/or operations (e.g., such as those described herein).

Those skilled in the art will appreciate that certain portions or components thereof as described or usable with the elements and methods described herein may generally be implemented using any suitable computing system or device, including distributed or networked computing environments, and the like. Such computing systems or devices may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

In various implementations, the update rate of the measuring probe 300 may correspond to a rate at which the measuring probe 300 outputs measurement signals Str. As noted above, in certain implementations, the clock timer portion 367A, compare value portion 367B and switch settings portion 367C may be utilized as part of a process for setting and/or implementing the update rate (e.g., as a first update rate, or a second update rate) of the measuring probe 300. The A-to-D converter 367D may be utilized for providing a digital measurement signal Str (e.g., may convert the output amplified signals Sa1 to Sa4 to digital signals for further processing such as determining a combined signal, etc.) In general, a lower update rate may correspond to less frequent utilization of the A-to-D converter 367D and/or other components (e.g., as may correspond to lower power dissipation/heat generation within the measuring probe 300, etc.)

In one implementation, the clock timer portion 367A implements a clock timer that schedules analog-to-digital converter readings of the A-to-D converter 367D, therefor also sending trigger packets (e.g., as related to measurement signals Str) at a fixed interval (e.g., in one specific example implementation for a relatively faster/second update rate of nominally 100 KHz). In various implementations, this relatively faster update rate of the measuring probe 300 may be utilized during at least part of a measuring mode.

In order to implement a relatively slower update rate, the compare value portion 367B (e.g., which may be part of the clock timer portion 367A) is configured to store a compare value (e.g., which may also be referenced as an update rate value) for the clock timer portion 367A, for which the stored compare value determines the relatively slower update rate. As some specific numerical examples, the stored compare value for the relatively slower update rate may in certain implementations be larger (e.g., nominally 10× to 50× larger) than a compare value that would correspond to the relatively faster update rate (e.g., 100 KHz) as noted above, thus resulting in a relatively slower update rate of nominally 10 KHz to 2 KHz. In one example implementation, the programmable compare value in the compare value portion 367B may be set to produce a relatively slower update rate that is within a certain range (e.g., such as less than 100 KHz but more than 2 KHz). It will be appreciated that as the clock timer of the clock timer portion 367A is running, when an amount of time has passed that corresponds to the compare value, an analog-to-digital converter reading (e.g., utilizing the A-to-D converter 367D) is correspondingly taken, for which such operations correspond to the update rate. Thus, a higher compare value will correspond to a relatively slower update rate (e.g., and less frequent utilization of components such as the A-to-D converter 367D), while a lower compare value will correspond to a relatively higher update rate (e.g., and more frequent utilization of components such as the A-to-D converter 367D).

In further regard to such correspondence, it will be appreciated that in an instance where a previously existing system may be modified according to principles disclosed herein, such may require increasing the capability (e.g., extending a number of bits) in a clock timer, for example. More specifically, in a previously existing system where only a relatively faster update rate was utilized, a corresponding clock timer may have only been required to count up to a time corresponding to a relatively lower (e.g., smaller) value. In contrast, in accordance with principles disclosed herein, if a relatively higher (e.g., larger) compare value is to be utilized for an implementation including utilizing a relatively slower update rate in addition to the faster update rate, the originally designed clock timer of such prior systems may not have had sufficient capacity (e.g., bits) for counting to the higher time value. As a result, in accordance with principles disclosed herein, a modification may be needed to a clock timer of such a previously existing system (e.g., such as extending the number of bits of the clock timer so that it is also capable of counting to the new higher compare value for implementing the slower update rate in addition to the faster update rate).

In various implementations, the compare value as stored in the compare value portion 367B is programmable (e.g., as programmable by the system controller portion 140). For example, the CMM controller portion 140' of the system controller portion 140 may implement control (e.g., sending a signal such as a command to the probe interface controller portion 145 which may send a signal such as a command to the measuring probe 300) for programming (e.g., modifying) the compare value (e.g., for taking samples at the corresponding programmed rate).

In various implementations, the programmed compare value as noted above may be utilized for implementing the relatively slower update rate (e.g., corresponding to a value such as 10 KHz, or other value in a range such as above 2 KHz but less than 100 KHz), whereas the fixed interval as noted above (e.g., corresponding to a value such as 100 KHz) may be utilized for implementing the relatively faster update rate. In various implementations, a separate setting (e.g., a value) may be utilized for switching between the relatively faster and slower update rates (e.g., such as stored or otherwise implemented in the switch settings portion 367B). For example, the probe interface controller 145 (e.g., as controlled by other portions or otherwise) may provide a signal (e.g., send a command, such as a write command) to the measuring probe 300 to have a setting (e.g., a value) in the switch settings portion 367B correspond to a setting for either the relatively faster update rate or the relatively slower update rate.

In one specific example implementation, the setting for the faster or slower update rate may correspond to a single bit (e.g., with a value of 0 for the faster update rate and a value of 1 for the slower update rate, or vice versa). In such an implementation, the switch settings portion 367B may in some instances also store values for other settings, for which a process may be utilized for only changing the bit corresponding to the update rate (e.g., in instances where only the update rate is to be changed at the given time). In various implementations, the switch settings portion 367B may be implemented as a virtual switch. Certain operations related to the switch settings portion 367B will also be described in more detail below with respect to the timing diagram of FIG. 7.

In accordance with principles disclosed herein, in various implementations the magnitude of power-on drift of the measuring probe 300 in comparison to previous configurations can be reduced by actively switching the update rate of the measuring probe between a relatively faster/higher update rate and a relatively slower/lower update rate. As noted above, such update rates of the measuring probe 300 may correspond to the update rate of the A-to-D converter 367D and other processing electronics, such as in accordance with the clock timer portion 367A as scheduling analog-to-digital converter readings of the A-to-D converter 367D (e.g., which may be a particular source of power dissipation/heat generation) according to the update rate, etc. Utilization of the slower/lower update rate for certain periods of time (e.g., which may equate to over 50% of the overall operating time of the measuring probe in certain implementations) may effectively decrease the electrical power dissipated in the measuring probe, effectively lowering the duty cycle of the electronics and correspondingly reducing the magnitude of the power-on drift of the measuring probe 300.

As will be described in more detail below, in various implementations the slower update rate may be utilized when precise measurements are not needed (e.g., when the system is in a moving mode, during which it is still desirable to have the slower update rate operating, such as for detecting accidental collisions of the measuring probe with the workpiece or other objects, etc.) The faster update rate may be utilized when high precision measurements are required, such as during a measuring mode of the system (e.g., for more precisely determining measurement coordinates as corresponding to when touch signals occur). In various implementations, the CMM controller portion 140' of the system controller portion 140 may communicate to the probe interface controller portion 145 to indicate (e.g., may provide a signal that indicates) what the update rate should currently be, and the probe interface controller portion 145 may then communicate to the measuring probe 300 (e.g., may provide a signal such as a command) to implement (e.g., change to) the indicated update rate.

Figure 4B:
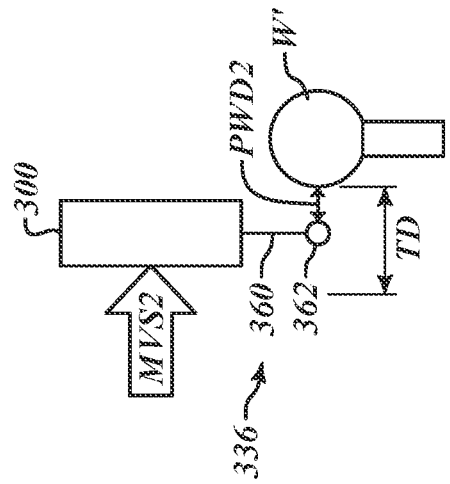
FIGS. 4A and 4B are diagrams illustrating movements of a measuring probe in relation to a threshold distance from a workpiece.
Figure 4A:
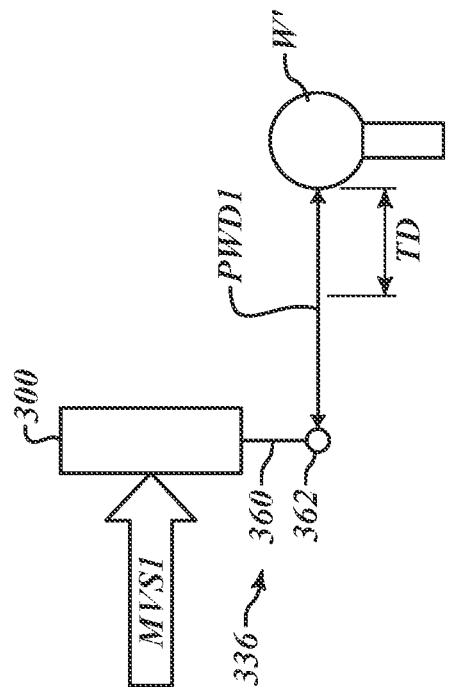

FIGS. 4A and 4B are diagrams illustrating movements of a measuring probe 300 in relation to a threshold distance TD from a workpiece. In the example of FIG. 4A, the measuring probe 300 is being moved such that the contact portion 362 is being moved toward the workpiece W' (e.g., for approaching a measuring position for acquiring measurement data for measuring the workpiece W'). In the condition of FIG. 4A, the contact portion 362 is still at a relatively long distance from the workpiece W', as indicated by a first probe-to-workpiece distance PWD1 (i.e., which corresponds to the distance between the contact portion 362 and a closest surface point of the workpiece W'), which is shown to be greater than the threshold distance TD. In various implementations, the threshold distance TD may alternatively be referred to as a safety distance. In relation to the first probe-to-workpiece distance PWD1 being greater than the threshold distance TD, the measuring probe (i.e., and correspondingly the contact portion 362) is illustrated as being moved at a first movement speed MVS1 (e.g., which may be a relatively high movement speed).

As illustrated in FIG. 4B, as the contact portion 362 approaches the workpiece W', such as illustrated by a second probe-to-workpiece distance PWD2 that is less than the threshold distance TD, the movement of the measuring probe 300 may be slowed to a second movement speed MVS2 (i.e., which is slower than the first movement speed MVS1). In general, the transition from the first movement speed MVS1 to the second movement speed MVS2 may be made in response to an indication that the contact portion 362 has passed (i.e., that the probe-to-workpiece distance has become smaller than) the threshold distance TD. In one specific example implementation, the threshold distance TD may be approximately 5 millimeters. In various implementations, the threshold distance TD may be selectable by a user (e.g., where the user may set the threshold distance TD to a desired value).

In further regard to the utilization of the first and second movement speeds MVS1 and MVS2, it will be appreciated that in some implementations it may be considered relatively safe/acceptable to move the measuring probe 300 at the relatively faster movement speed MVS1 while the contact tip 362 of the measuring probe is at a sufficient distance from the workpiece W' (e.g., greater than the threshold distance), and thus less likely to be in danger of colliding with the workpiece W' (e.g., as may damage the measuring probe, the CMM and/or the workpiece W', etc.) Also, there is typically less need for acquiring highly accurate measurement data during such motions (e.g., for which a relatively slower update rate may be utilized during at least part of such motions in accordance with principles disclosed herein). In contrast, when the contact portion 362 of the measuring probe 300 is moving towards the workpiece W' (e.g., for taking a measurement of the workpiece) and is less than the threshold distance TD from the workpiece W', it may be desired to reduce the movement of the measuring probe 300 to the second movement speed MVS2, as part of a process of more precise control and to reduce the danger of a possible collision. The slower movement speed also enables more highly accurate measurement data to be obtained over a shorter distance during such motion (e.g., for which a relatively faster update rate may be utilized during at least part of such motions in accordance with principles disclosed herein).

Figure 5:
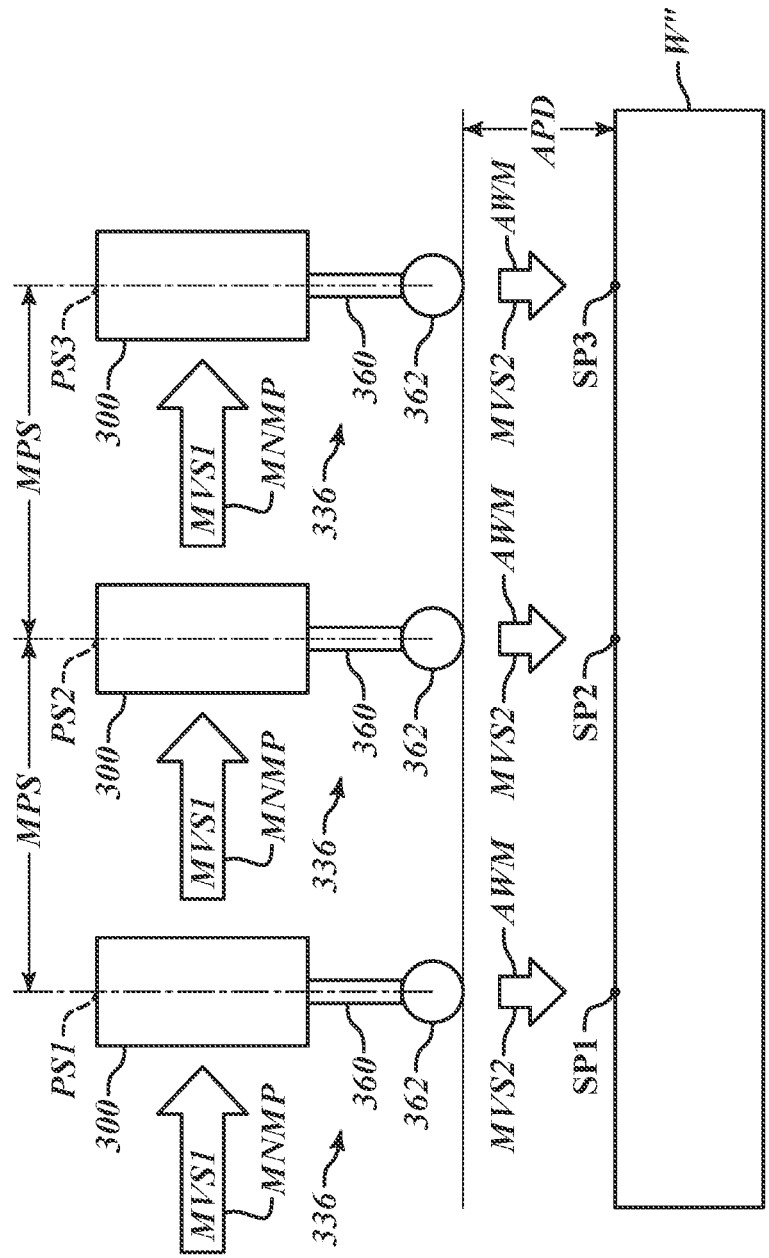
FIG. 5 is a diagram illustrating movements of a measuring probe for measuring surface points on a workpiece.

FIG. 5 is a diagram illustrating movements of a measuring probe 300 for measuring surface points SP on a workpiece W". As illustrated in FIG. 5, in reference to the left side of the page, the measuring probe 300 is moved at the first movement speed MVS1 to a first measuring position PS1 as part of a move-to-next-measuring-position motion MNMP. After reaching the first measuring position PS1, the measuring probe 300 is moved such that the contact portion 362 is moved towards a first surface point SP1 of the workpiece W" at a second movement speed MVS2 as part of an approach-workpiece-and-measure motion AWM. The approach-workpiece-and-measure motion AWM may be performed as the contact portion 362 is moved over an approach distance APD (e.g., as may correspond to or otherwise be related to a threshold distance TD such as indicated in FIGS. 4A and 4B). The approach-workpiece-and-measure motion AWM may include the contact portion 362 contacting the surface point SP1 of the workpiece W" (e.g., as may correspond to a touch signal). The approach-workpiece-and-measure motion AWM may thus be part of a process for acquiring measurement data corresponding to the first surface point SP1 (e.g., such as for measuring the first surface point SP1, and as may indicate the measurement coordinates of the first surface point SP1, such as may be in accordance with or referenced to an XYZ coordinate system of the CMM or otherwise).

Following the approach-workpiece-and-measure motion AWM, a touchback motion may be performed (i.e., as not illustrated in FIG. 5 but as will be described in more detail below with respect to FIG. 6) in which the measuring probe 300 is moved such that the contact portion 362 is backed away from the workpiece W" (e.g., as moved back to the approach distance APD, such as after the process for measuring the surface point SP1 is completed). In one example, the touchback motion may essentially be the opposite (e.g., in the opposite direction) of the most recent approach-workpiece-and-measure motion AWM, except as may in some implementations be performed at the first movement speed MVS1 (i.e., in contrast to the approach-workpiece-and-measure motion AWM which may be performed at the second movement speed MVS2).

In the present example, after the measuring probe 300 with the contact portion 362 has returned to the first measuring position PS1 (or the contact portion 362 has otherwise been returned to the approach distance APD), the measuring probe 300 may begin movement toward a second measuring position PS2. The movement of the measuring probe 300 to the second measuring position PS2 may be according to the first movement speed MVS1, as part of a move-to-next-measuring-position motion MNMP. In general, a distance between the measuring positions (e.g., a distance between the first measuring position PS1 and the second measuring position PS2) may be referenced as a measuring position spacing MPS. As indicated, the measuring position spacing MPS corresponds to a distance between consecutive measuring positions.

After arriving at the second measuring position PS2, the measuring probe 300 with the contact portion 362 may again be moved according to an approach-workpiece-and-measure motion AWM, which is conducted at the second movement speed MVS2. As part of the approach-workpiece-and-measure motion AWM, the measuring probe may be moved such that the contact portion 362 may approach and contact the surface point SP2 of the workpiece W" (e.g., as part of a process for acquiring measurement data corresponding to the second surface point SP2, such as for measuring the second surface point SP2, and as may indicate the coordinates of the second surface point SP2). After the measurement of the second surface point SP2 has been completed, a touchback motion may be conducted (e.g., as illustrated in FIG. 6), which may be in the opposite direction of the approach-workpiece-and-measure motion AWM (e.g., for moving the measuring probe 300 such that the contact portion 362 is backed away from the workpiece W" back to the approach distance APD), such as for the measuring probe 300 to return to the second measuring position PS2.

The process may then repeat, with the measuring probe 300 being moved according to a move-to-next-measuring-position motion MNMP at the first movement speed MVS1, so as to move from the second measuring position PS2 to a third measuring position PS3. The measuring probe 300 with the contact portion 362 may then again be moved with an approach-workpiece-and-measure motion AWM at the second movement speed MVS2 such that the contact portion 362 is moved toward the surface point SP3 of the workpiece W", for approaching and contacting the surface point SP3 (e.g., as part of a process for acquiring measurement data corresponding to the third surface point SP3, such as for measuring the third surface point SP3, and as may indicate the coordinates of the third surface point SP3). In this example, the measuring probe 300 may then be moved according to a touchback motion (e.g., as illustrated in FIG. 6), which may be in the opposite direction as the most recent approach-workpiece-and-measure motion AWM, and as may be performed at the first movement speed MVS1 (e.g., for moving the measuring probe 300 such that the contact portion 362 is backed away from the workpiece W', such as to return the measuring probe 300 to the third measuring position PS3).

It will be appreciated that for each of the illustrated move-to-next-measuring-position motions MNMP, in various implementations where the approach distance APD is equal to or greater than a threshold distance TD (e.g., as illustrated in FIGS. 4A and 4B), then in such implementations each of the motions MNMP may be characterized as corresponding to a movement of the measuring probe 300 such that the contact portion 362 is moved at a distance from the workpiece W" that is equal to or greater than the threshold distance TD. In addition, in various implementations each of the illustrated approach-workpiece-and-measure motions AWM may be characterized as a movement of the measuring probe 300 such that the contact portion 362 is moved toward the workpiece W" (e.g., for obtaining a measurement). Furthermore, in various implementations, each of the described touchback motions TBM (e.g., as indicated as being in an opposite direction as the corresponding approach-workpiece-and-measure motions AWM) may be characterized as a movement of the measuring probe 300 such that the contact portion 362 is moved away from the workpiece W". As will be described in more detail below, in accordance with principles disclosed herein, during at least part of the move-to-next-measuring-position motions MNMP and touchback motions TBM, the measuring probe 300 may operate with a relatively slower update rate, and during at least part of the approach-workpiece-and-measure motions AWM, the measuring probe 300 may operate with a relatively faster update rate.

Figure 6:
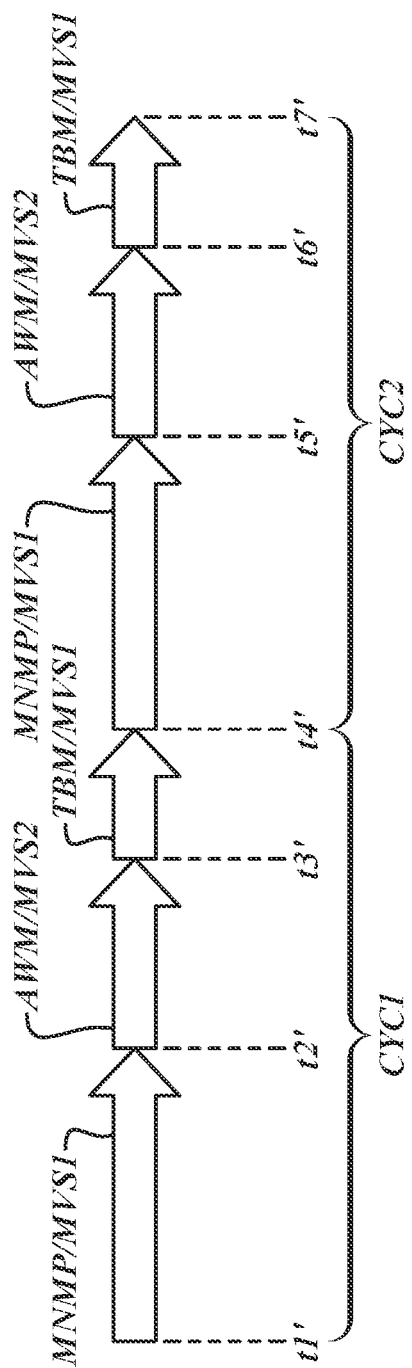
FIG. 6 is a timing diagram illustrating cycles of movements of a measuring probe for measuring surface points on a workpiece.

FIG. 6 is a timing diagram illustrating cycles CYC of movements of a measuring probe 300 (e.g., as may correspond to certain examples of FIG. 5). In various implementations, the cycles CYC may be measurement cycles (e.g., with each measurement cycle CYC representing part of a process for acquiring measurement data corresponding to a respective surface point, such as for measuring the respective surface point, and as may indicate the measurement coordinates of the respective surface point). As illustrated in FIG. 6, as part of a first measurement cycle CYC1, between times t1' and t2', a measuring probe 300 with the contact portion 362 may be moved according to a move-to-next-measuring-position motion MNMP at the first movement speed MVS1. Between times t2' and t3', the measuring probe with the contact portion 362 may be moved according to an approach-workpiece-and-measure motion AWM at the second movement speed MVS2. As illustrated in FIG. 5, such movement may be conducted for having the contact portion 362 approach and contact a surface point SP on a workpiece. Between times t3' and t4', the measuring probe may be moved according to a touchback motion TBM which is conducted at the first movement speed MVS1. As described with respect to FIG. 5, such a touchback motion may in certain implementations be in an opposite direction as the approach-workpiece-and-measure motion AWM (e.g., for backing the contact portion 362 of the measuring probe 300 away from the workpiece). In various implementations, the series of motions MNMP, AWM and TBM may correspond to the first measurement cycle CYC1.

As further illustrated in FIG. 6, a second measurement cycle CYC2 includes a similar series of motions. More specifically, between times t4' and t5', the measuring probe 300 with the contact portion 362 is moved according to a move-to-next-measuring-position motion MNMP at the first movement speed MVS1. Between times t5' and t6', the measuring probe 300 with the contact portion 362 is moved according to an approach-workpiece-and-measure motion AWM at the second movement speed MVS2. Between times t6' and t7', the measuring probe 300 with the contact portion 362 is moved according to a touchback motion TBM at the first movement speed MVS1. As described with respect to FIG. 5, in various implementations, the first and second measurement cycles CYC1 and CYC2 may be for measuring different (e.g., consecutive) surface points on the workpiece (e.g., for measuring the surface points SP1 and SP2, or the surface points SP2 and SP3, or any other two consecutive surface points to be measured along the movement path of the measuring probe 300).

In various implementations, each of the motions may be performed as parts of certain modes (e.g., as may correspond to modes of the CMM, system and/or other system portions, etc.) For example, as will be described in more detail below with respect to FIG. 7, part of all of a first instance of a moving mode MVM may include the move-to-next-measuring-position motion MNMP between the times t1' and t2'. Part or all of a first instance of a measuring mode MSM may include the approach-workpiece-and-measure motion AWM between the times t2' and t3'. Part or all of a second instance of a moving mode MVM may include the touchback motion TBM between the times t3' and t4' and/or the move-to-next-measuring-position motion MNMP between the times t4' and t5'. Part or all of a second instance of a measuring mode MSM may include the approach-workpiece-and-measure motion AWM between the times t5' and t6'. Part of all of a third instance of a moving mode MVM may include the touchback motion TBM between the times t6' and t7'.

Figure 7:
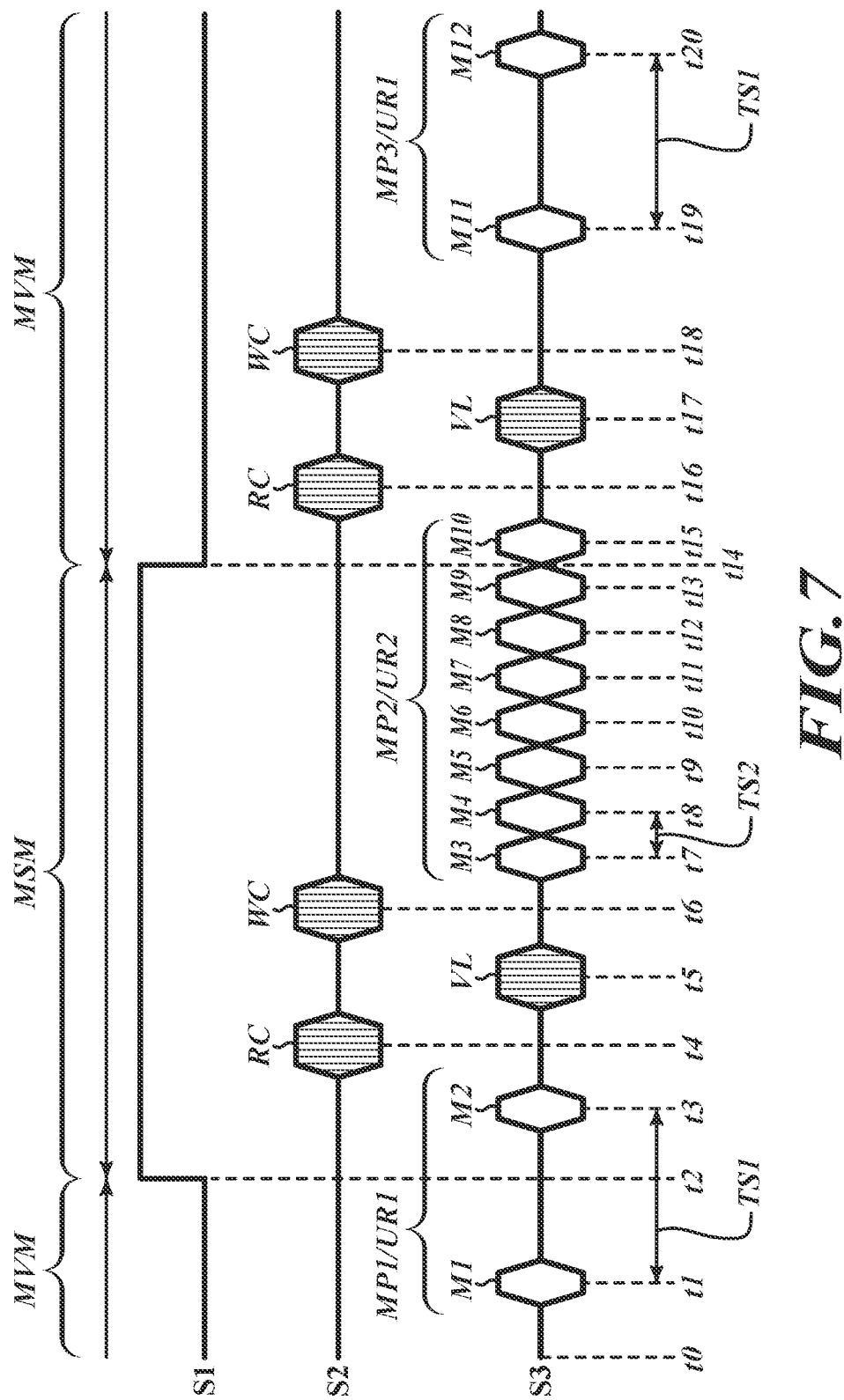
FIG. 7 is a timing diagram illustrating certain operations of a measuring system in relation to a moving mode and a measuring mode.

FIG. 7 is a timing diagram illustrating certain operations of a measuring system in relation to instances of a moving mode MVM and a measuring mode MSM. It will be appreciated that certain timeline portions as illustrated in FIG. 7 (e.g. and in other figures herein) may in some instances not be to scale, and may have been exaggerated or minimized in order to simplify and/or better illustrate certain concepts and principles as disclosed herein.

In the example of FIG. 7, a first signal portion S1 represents a mode signal (e.g., as provided/sent from a CMM controller portion 140' to a probe interface controller portion 145). In various implementations, the mode signal may be a signal, or may be related to a signal, that may be provided by a CMM controller portion in relation to certain functions. For example, during motions such as a move-to-next-measuring-position motion MNMP at a first movement speed MVS1, in some systems it may be desirable to reduce the sensitivity of a measuring probe to prevent vibrations that result from the movement (e.g., which may result in movement/deflection of a contact portion) from exceeding a touch trigger signal switching threshold (e.g., as may otherwise be indicated as a touch signal). In certain implementations, the mode signal (or a related signal) may be provided by a CMM controller portion (e.g., with the mode signal switched to, or otherwise provided in, a low state) to switch a measuring probe into a low sensitivity mode. In such a low sensitivity mode, a touch trigger signal switching threshold may be altered or otherwise for which a contact portion 362 is required to remain moved/deflected for a specified amount of time in order to correspond to a touch trigger signal, and for which movements/deflections resulting from vibrations, which oscillate quickly rather than having a steady deflection for a period of time, would not meet such criteria.

In FIG. 7, a second signal portion S2 represents certain signals (e.g., as sent from the probe interface controller portion 145 to the signal processing portion 366 in the measuring probe 300). A third signal portion S3 represents certain signals (e.g., as sent from the signal processing portion 366 of the measuring probe 300 to the probe interface controller portion 145 of the system controller portion 140). As illustrated in FIG. 7, a first instance of a moving mode MVM occurs between times t0 and t2, while a first instance of a measuring mode MSM occurs between times t2 and t14, and a second instance of a moving mode MVM occurs between times t14 and t20.

At a time t0, as indicated by the signal portion S1, the mode signal is in a low state. At a time t1, as indicated by the signal portion S3, a measurement signal portion M1 is sent from the measuring probe 300 (e.g., from the signal processing portion 366) to the probe interface controller portion 145. At a time t2, as indicated by the signal portion S1, the mode signal transitions from a low state to a high state, as is provided/sent from the CMM controller portion 140' to the probe interface controller portion 145. In various implementations, for the mode signal, the low state may be referenced as a first state and the high state may be referenced as a second state, or vice versa. In response to the transition of the mode signal, the probe interface controller portion 145 is set/prepared to transition the update rate of the measuring probe, but waits to initiate the transition until the measuring probe 300 completes the current measurement signal interval for providing a next measurement signal portion. At a time t3, as indicated by the signal portion S3, the measuring probe sends the next/final measurement signal portion M2 of a first measuring period MP1 (e.g., after which the probe interface controller portion 145 initiates a process for transitioning the update rate of the measuring probe 300, as will be described in more detail below).

The measurement signal portions M1 and M2 comprise measurement signals during the first measuring period MP1 (e.g., as typically indicating that the contact portion 362 of the measuring probe 300 is not currently contacting the workpiece W, such as during at least part of the moving mode, although will indicate if any unintended collision with the workpiece or other obstacle has occurred in which case an immediate stop or other appropriate action may be taken). The time spacing between the measurement signal portions M1 and M2 as occurring at times t1 and t3 (e.g., indicated as a time spacing TS1 between centers of the measurement signal portions M1 and M2 and as indicating a frequency of the measurement signal portions) is according to a first update rate UR1, as utilized during the first measuring period MP1.

In the example of FIG. 7, after the measuring probe 300 sends the final/next measurement signal portion M2 at the time t3 which corresponds to the end of the first measuring period MP1, at a time t4, as indicated by the signal portion S2, the probe interface controller portion 145 provides a signal (e.g., sends a read command RC) to the measuring probe 300 (e.g., as a first step in a process for transitioning the update rate of the measuring probe 300). At a time t5, as indicated by the signal portion S3, in response to the signal (e.g., the read command RC) sent at the time t4, the measuring probe 300 provides a signal (e.g., sends a value response VL) back to the probe interface controller portion 145 (e.g., for which the value response VL indicates a value, such as set in a virtual switch, which indicates that the measuring probe 300 is currently operating with the first update rate, as well as any additional values of the virtual switch). At a time t6, as indicated by the signal portion S2, in response to the signal (e.g., the value response VL) sent at the time t5, the probe interface controller portion 145 provides a signal (e.g., sends a write command WC) to the measuring probe 300 which indicates (e.g., commands) that the update rate of the measuring probe 300 is to be changed/transitioned to a second update rate UR2 (e.g., such as may include changing the corresponding value as stored in the virtual switch, while leaving other values of the virtual switch as unchanged).

At a time t7, as indicted by the signal portion S3, after the signal (e.g., the write command WC) as sent at the time t6 has been received by the measuring probe 300, a second measuring period MP2 begins, during which the measuring probe is operated at a second update rate UR2. As indicated by the signal portion S3, the measuring probe 300 sends (e.g., outputs) measurement signal portions M3, M4, M5, M6, M7, M8, M9 and M10 at respective times t7, t8, t9, t10, t11, t12, t13 and t15 (e.g., as sent to the probe interface controller portion 145). The time spacings between the timings of the measurement signal portions M3-M10 (e.g., with a representative time spacing TS2 indicated between the centers of the measurement signal portions M3 and M4 at the times t7 and t8 and as indicating a frequency of the measurement signal portions) are noted to be shorter than the time spacing between the timings of the measurement signal portions M1 and M2 (e.g., indicated as a time spacing TS1), in accordance with the second update rate UR2 of the second measuring period MP2 being faster than the first update rate UR1 of the first measuring period MP1.

At a time t14, as indicated by the signal portion S1, the mode signal transitions from a high state to a low state, as is provided/sent from the CMM controller portion 140' to the probe interface controller portion 145. In response to the transition of the mode signal, the probe interface controller portion 145 is set/prepared to transition the update rate of the measuring probe, but waits to initiate the transition until the measuring probe 300 completes the current measurement signal interval for providing a next measurement signal portion. At a time t15, as indicated by the signal portion S3, the measuring probe 300 sends a next/last measurement signal portion M10 to the probe interface controller portion 145, as part of the end of the measuring period MP2.

At a time t16, as indicated by the signal portion S2, in response to receiving the measurement signal portion M10 at the time t15, the probe interface controller portion 145 initiates a process for transitioning the update rate of the measuring probe by providing a signal (e.g., sending a read command RC) to the measuring probe 300. At a time t17, as indicated by the signal portion S3, in response to the signal (e.g., the read command RC) at the time t16, the measuring probe 300 provides a signal (e.g., sends a value response VL) back to the probe interface controller portion 145 (e.g., for which the value response VL indicates a value, such as set in a virtual switch, which indicates that the measuring probe 300 is currently operating with the second update rate, as well as any additional values of the virtual switch). At a time t18, as indicated by the signal portion S2, in response to the signal (e.g., the value response VL) at the time t17, the probe interface controller portion 145 provides a signal (e.g., sends a write command WC) to the measuring probe 300 which indicates (e.g., commands) that the update rate of the measuring probe 300 is to be changed/transitioned to a first update rate UR1 (e.g., such as may include changing the corresponding value as stored in the virtual switch, while leaving other values of the virtual switch as unchanged).

At a time t19, as indicated by the signal portion S3, the measuring probe 300 begins a third measuring period MP3 by outputting a measurement signal portion M11. The measuring probe 300 continues the third measuring period M3 by outputting a measurement signal portion M12 at a time t20. The time spacing between the measurement signal portions M11 and M12 at the times t19 and t20 (e.g., indicated as a time spacing TS1) is according to the first update rate UR1, as utilized during the third measuring period MP3.

In various implementations, certain additional techniques may be utilized in relation to the time spacing TS1 between the measurement signal portions M11 and M12 at the respective timings corresponding to times t19 and t20 (e.g., and in relation to the earlier referenced time spacing TS1 between the measurement signal portions M1 and M2 at the respective timings corresponding to times t1 and t3). More specifically, during the time spacings TS1 between the measurement signal portions (e.g., between the times t1 and t3, or times t19 and t20), when operating with the first update rate UR1 (e.g., as illustrated for the first and third measuring periods MP1 and MP3), certain portions (e.g., of the clock timer portion 367A and/or other portions of the system) may have reduced operations (e.g., may be at least partially disabled or operated less frequently, such as compared to while operating with the second update rate UR2), so as to further conserve energy/lower power dissipation in the measuring probe 300. It will be appreciated that such techniques are enabled by utilization of the first update rate UR1 with the relatively large time spacings TS1 (e.g., as compared to prior systems where only a relatively faster update rate was utilized such as corresponding to the time spacings TS2 with relatively less or no opportunity to reduce the operations of certain components during such short time spacings).

In various implementations, the measuring period MP2 with the second update rate UR2 and the corresponding measurement signal portions M3-M10 may correspond to at least part of a process for measuring a surface point (e.g., surface point SP1, SP2 or SP3 on the workpiece W" as illustrated in FIG. 5), and as may be utilized in conjunction with at least part of an approach-workpiece-and-measure motion AWM (e.g., which may correspond to at least part of an instance of a measuring mode MSM). In contrast, the measuring periods MP1 and MP3 with the first update rate UR1 and the corresponding measurement signal portions M1-M2 and M11-M12 may correspond to processes for moving a measuring probe when measurements of a workpiece surface are not intended to be acquired (e.g., as may correspond to less frequent measurement data), and as may be utilized in conjunction with at least part of a move-to-next-measuring-position motion MNMP and/or a touchback motion TBM (e.g., which may correspond to at least part of a moving mode MVM). It will be appreciated that the first update rate UR1 (i.e., which is slower than the second update rate UR2) is still sufficient for monitoring for accidental collisions of the contact portion 362 or other portions of the measuring probe with the workpiece W" or other objects in the environment. In various implementations, should such a collision be detected, appropriate action may be taken (e.g., a signal such as a command may be sent to immediately stop movement of the CMM and/or to otherwise limit any damage etc. in relation to such a collision, etc.)

Figure 8:
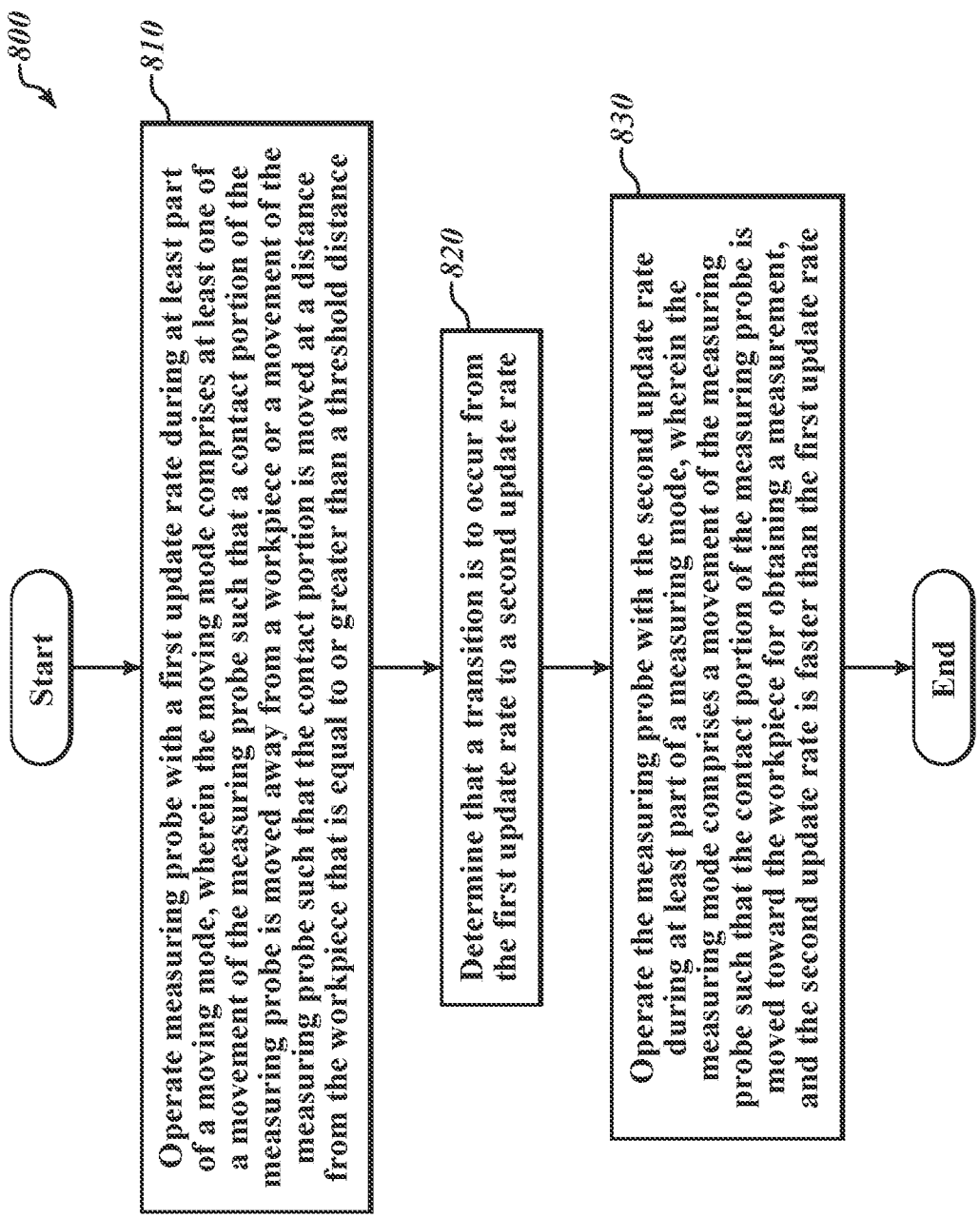
FIG. 8 is a flow diagram illustrating an exemplary implementation of a method for operating a measuring system including a measuring probe.

FIG. 8 is a flow diagram illustrating an exemplary implementation of a method 800 for operating a measuring system including a measuring probe. At a block 810, the measuring probe is operated with a first update rate (e.g., update rate UR1) during at least part of a moving mode (e.g., a moving mode MVM). The moving mode comprises at least one of a movement of the measuring probe such that a contact portion of the measuring probe is moved away from a workpiece (e.g., such as may occur as part of a touchback motion TBM at a first movement speed MVS1, etc.) or a movement of the measuring probe such that the contact portion is moved at a distance from the workpiece that is equal to or greater than a threshold distance (e.g., such as may occur as part of a move-to-next-measuring-position motion MNMP at the first movement speed MVS1, etc.)

At a block 820, a determination is made that a transition is to occur from the first update rate to a second update rate (e.g., in accordance with a transition of a mode signal, for which a controller portion may provide a signal, such as sending a command, that indicates that the measuring probe is to transition from operating with the first update rate to operating with the second update rate). At a block 830, the measuring probe is operated with a second update rate (e.g., update rate UR2) during at least part of a measuring mode (e.g., measuring mode MSM). The measuring mode comprises movement of the measuring probe such that the contact portion of the measuring probe is moved toward the workpiece for obtaining a measurement (e.g., such as may occur as part of an approach-workpiece-and-measure motion AWM at the second movement speed MVS2). As part of such operations, the second update rate (e.g., update rate UR2) is faster than the first update rate (e.g., update rate UR1).

The following describes various exemplary embodiments of the present disclosure with various features and elements annotated with reference numerals found in FIGS. 1-8. It should be understood that the reference numerals are added to indicate exemplary embodiments, and the features and elements are not limited to the particular embodiments illustrated in FIGS. 1-8.

As described herein, a measuring system 100 is provided comprising a measuring probe 300 which includes a stylus 336, at least one detection element 325 and a signal processing portion 366. The stylus 336 has a contact portion 362 to be in contact with a workpiece W to be measured. The at least one detection element 325 is capable of detecting a movement of the contact portion 362 as corresponding to a contact with the workpiece W. The signal processing portion 366 is configured to process a generated signal Sg obtained from an output Ss of the at least one detection element 325 to output a measurement signal Str.

The measuring probe 300 is configured to operate with a first update rate UR1 during at least part of a moving mode MVM (e.g., corresponding to a moving mode of a CMM 200 that moves the measuring probe 300). The moving mode MVM comprises at least one of a movement of the measuring probe 300 such that the contact portion 362 is moved away from the workpiece W, or a movement of the measuring probe 300 such that the contact portion 362 is moved at a distance from the workpiece W that is equal to or greater than a threshold distance TD.

The measuring probe 300 is further configured to operate with a second update rate UR2 (i.e., which is faster than the first update rate) during at least part of a measuring mode MSM (e.g., corresponding to a moving mode of the CMM 200 that moves the measuring probe 300). The measuring mode MSM comprises a movement of the measuring probe 300 such that the contact portion 362 is moved toward the workpiece W (e.g., while at a distance from the workpiece that is within the threshold distance TD) for obtaining a measurement. In various implementations, the second update rate UR2 is at least two times faster than the first update rate UR1, and in some instances may be at least ten or fifty times faster. As some specific numerical examples, in an implementation where the second update rate corresponds to approximately 100 KHz, the first update rate may correspond to approximately 50 KHz, or 10 KHz, or 2 KHz (e.g., such as within a range of 2 KHz to 50 KHz).

In various implementations, the first update rate UR1 and the second update rate UR2 correspond to rates at which the signal processing portion 366 outputs measurement signals Str. The signal processing portion 366 may include an analog-to-digital converter (e.g., of an analog-to-digital converter portion 367D). The processing of the generated signal Sg obtained from an output Ss of the at least one detection element 325 may include an analog-to-digital conversion, and the analog-to-digital converter may be operated less frequently while operating with the first update rate UR1 than while operating with the second update rate UR2.

In various implementations, the measuring probe 300 receives and stores a first update rate value (e.g., a first update rate compare value) which determines the first update rate UR1 (e.g., as sent from the system controller portion 140 and as stored in the compare value portion 367B). In various implementations, a controller portion (e.g., probe interface controller portion 145 of system controller portion 140) is configured to provide a signal (e.g., send a command such as a write command WC to switch the single bit in the switch settings portion 367C) which indicates that the measuring probe 300 is to transition from operating with the first update rate UR1 to operating with the second update rate UR2. In various implementations, a determination to transition from the first update rate UR1 to the second update rate UR2 may be based at least in part on a transition of a mode signal (e.g., as indicated by signal portion S1) from a first signal level to a second signal level, for which a transition of the mode signal may be related to a transition between the moving mode MVM and the measuring mode MSM. In some implementations, there may be a delay between when the mode signal transitions and when a corresponding transition occurs between the moving mode MVM and the measuring mode MSM and/or between the measuring mode MSM and the moving mode MVM.

In various implementations, the moving mode MVM and the measuring mode MSM correspond to modes of a coordinate measuring machine CMM which operates to move the measuring probe 300 including the contact portion 362 in relation to the workpiece W. In various implementations, the movement of the measuring probe 300 during at least part of the moving mode MVM is at a first movement speed MVS1, and the movement of the measuring probe 300 during at least part of the measuring mode MSM is at a second movement speed MVS2, for which the first movement speed MVS1 is faster than the second movement speed MVS2.

In various implementations, the measuring probe 300 is configured to operate with the first update rate UR1 during at least part of a first instance of the moving mode MVM. The first instance of the moving mode MVM may include movement of the measuring probe 300 such that the contact portion 362 is moved toward a first measuring position PS1 relative to a first surface point SP1 on a workpiece W". The measuring probe 300 may be further configured to operate with the second update rate UR2 during at least part of a first instance of the measuring mode MSM. The first instance of the measuring mode MSM may include movement of the measuring probe 300 such that the contact portion 362 is moved toward the first surface point SP1 on the workpiece W" for obtaining a measurement of the first surface point.

In various implementations, the measuring probe 300 may be further configured to operate with the first update rate UR1 during at least part of a second instance of the moving mode MVM. The second instance of the moving mode may include movement of the measuring probe 300 such that the contact portion 362 is moved away from the first surface point SP1 after the measurement has been completed, and movement of the measuring probe 300 toward a second measuring position PS2 relative to a second surface point SP2 on the workpiece W'. The measuring probe 300 may be further configured to operate with the second update rate UR2 during at least part of a second instance of the measuring mode MSM. The second instance of the measuring mode MSM may include movement of the measuring probe 300 such that the contact portion 362 is moved toward the second surface point SP2 on the workpiece W'' for obtaining a measurement of the second surface point.

In various implementations, a controller portion may be configured to provide a signal (e.g., the CMM controller portion 140' may provide a mode signal in a low state on the signal portion S1, and/or in response to such a signal the probe interface controller portion 145 may provide a signal such as a write command WC on the signal portion S2) which indicates that the measuring probe 300 is to operate with the first update rate UR1 during at least part of a moving mode MVM. The controller portion may be further configured to provide a signal (e.g., the CMM controller portion 140' may provide a mode signal in a high state on the signal portion S1, and/or in response to such a signal the probe interface controller portion 145 may provide a signal such as a write command WC on the signal portion S2) which indicates that the measuring probe 300 is to operate with the second update rate UR2 during at least part of a measuring mode MSM.

In various implementations, a method for operating a measuring system 100 (i.e., including a measuring probe 300 with a contact portion 362 to be in contact with a workpiece W to be measured) is provided. The method includes operating the measuring probe 300 with a first update rate UR1 during at least part of a moving mode MVM. As part of the operations of the measuring system, a determination may be made (e.g., as based at least in part on a transition of a mode signal) that a transition is to occur from the first update rate UR1 to a second update rate UR2. The method further includes operating the measuring probe 300 with the second update rate UR2 (i.e., which is faster than the first update rate UR1) during at least part of a measuring mode MSM.

In various implementations, one or more components of the measuring system 100 may be designated as operating the measuring probe 300 with the first and second update rates UR1 and UR2. For example, the signal processing portion 366 may be designated as operating the measuring probe 300 with the first and second update rates. Alternatively or in addition, at least part of the system controller portion 140 (e.g., including the CMM controller portion 140' and/or the probe interface controller portion 145) may be designated as operating the measuring probe 300 with the first and second update rates.

In various implementations, the determination that the transition is to occur from the first update rate UR1 to the second update rate UR2 may be designated as being made by one or more components of the measuring system. In certain implementations, the determination may be designated as being made by at least part of the system controller portion 140. For example, the CMM controller portion 140' may be designated as making the determination as part of the process for providing the mode signal with a transition from a low state to a high state. Alternatively or in addition, the probe interface controller portion 145 may be designated as making the determination in response to receiving the mode signal with the transition from the CMM controller portion 140', for which the probe interface controller portion 145 correspondingly initiates a process for transitioning the update rate. Alternatively or in addition, the signal processing portion 366 of the measuring probe 300 may be designated as making the determination in response to receiving a signal (e.g., a write command WC) from the probe interface controller portion 145, for which the signal processing portion 366 correspondingly changes to the second update rate UR2 (e.g., such as by changing a corresponding value as stored in a virtual switch, such as of the switch settings portion 367C).

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A measuring system, comprising:
   a measuring probe comprising:
   a stylus having a contact portion to be in contact with a workpiece to be measured;
   at least one detection element capable of detecting a movement of the contact portion as corresponding to a contact with a workpiece; and
   a signal processing portion configured to process a generated signal obtained from an output of the at least one detection element to output a measurement signal;
   wherein the measuring probe is configured to:
   operate with a first update rate during at least part of a moving mode, wherein the moving mode comprises at least one of a movement of the measuring probe such that the contact portion is moved away from the workpiece or a movement of the measuring probe such that the contact portion is moved at a distance from the workpiece that is equal to or greater than a threshold distance; and
   operate with a second update rate during at least part of a measuring mode, wherein the measuring mode comprises a movement of the measuring probe such that the contact portion is moved toward the workpiece for obtaining a measurement, and the second update rate is faster than the first update rate.

2. The measuring system of claim 1, wherein the first and second update rates correspond to rates at which the signal processing portion outputs measurement signals.

3. The measuring system of claim 1, wherein the signal processing portion comprises an analog-to-digital converter, and the processing of the generated signal obtained from an output of the at least one detection element comprises an analog-to-digital conversion, and the analog-to-digital converter is operated less frequently while operating with the first update rate than while operating with the second update rate.

4. The measuring system of claim 1, further comprising a controller portion which is configured to provide a signal which indicates that the measuring probe is to transition from operating with the first update rate to operating with the second update rate.

5. The measuring system of claim 1, wherein a determination to transition from the first update rate to the second update rate is based at least in part on a transition of a mode signal from a first signal level to a second signal level, for which a transition of the mode signal is related to a transition between the moving mode and the measuring mode.

6. The measuring system of claim 1, wherein the moving mode and the measuring mode correspond to modes of a coordinate measuring machine which operates to move the measuring probe including the contact portion in relation to the workpiece.

7. The measuring system of claim 1, wherein:
the movement of the measuring probe during at least part of the moving mode is at a first movement speed;
the movement of the measuring probe during at least part of the measuring mode is at a second movement speed; and
the first movement speed is faster than the second movement speed.

8. The measuring system of claim 1, wherein:
the moving mode is a first instance of the moving mode and the movement of the measuring probe such that the contact portion is moved at a distance from the workpiece that is equal to or greater than a threshold distance includes movement of the measuring probe toward a first measuring position relative to a first surface point on the workpiece; and
the measuring mode is a first instance of the measuring mode and the movement of the measuring probe such that the contact portion is moved toward the workpiece for obtaining a measurement includes movement of the measuring probe such that the contact portion is moved toward the first surface point on the workpiece for obtaining a measurement of the first surface point.

9. The measuring system of claim 8, wherein the measuring probe is further configured to:
operate with the first update rate during at least part of a second instance of the moving mode, wherein the second instance of the moving mode includes movement of the measuring probe such that the contact portion is moved away from the first surface point after the measurement has been completed and the movement of the measuring probe such that the contact portion is moved at a distance from the workpiece that is equal to or greater than a threshold distance includes movement of the measuring probe toward a second measuring position relative to a second surface point on the workpiece; and
operate with the second update rate during at least part of a second instance of the measuring mode, wherein the second instance of the measuring mode includes movement of the measuring probe such that the contact portion is moved toward the second surface point on the workpiece for obtaining a measurement of the second surface point.

10. The measuring system of claim 1, wherein the measuring probe receives and stores a first update rate value which determines the first update rate.

11. The measuring system of claim 1, wherein the second update rate is at least two times faster than the first update rate.

12. A method for operating a measuring system including a measuring probe with a contact portion to be in contact with a workpiece to be measured, the method comprising:
operating the measuring probe with a first update rate during at least part of a moving mode, wherein the moving mode comprises at least one of a movement of the measuring probe such that the contact portion is moved away from the workpiece or a movement of the measuring probe such that the contact portion is moved at a distance from the workpiece that is equal to or greater than a threshold distance;
determining that a transition is to occur from the first update rate to a second update rate; and
operating the measuring probe with a second update rate during at least part of a measuring mode, wherein the measuring mode comprises a movement of the measuring probe such that the contact portion is moved toward the workpiece for obtaining a measurement, and the second update rate is faster than the first update rate.

13. The method of claim 12, wherein the determination to transition from the first update rate to the second update rate is based at least in part on a transition of a mode signal from a first signal level to a second signal level.

14. The method of claim 12, wherein the first and second update rates correspond to rates at which the measuring probe outputs measurement signals.

15. The method of claim 14, wherein the measurement signals are processed within the measuring probe utilizing an analog-to-digital converter, and the analog-to-digital converter is operated less frequently while operating with the first update rate than while operating with the second update rate.

16. The method of claim 12, wherein:
the movement of the measuring probe during at least part of the moving mode is at a first movement speed;
the movement of the measuring probe during at least part of the measuring mode is at a second movement speed; and
the first movement speed is faster than the second movement speed.

17. The method of claim 12, further comprising receiving and storing a first update rate value which determines the first update rate.

18. A measuring system, comprising:
a measuring probe comprising:
a stylus having a contact portion to be in contact with a workpiece to be measured;
at least one detection element capable of detecting a movement of the contact portion as corresponding to a contact with a workpiece; and
a signal processing portion configured to process a generated signal obtained from an output of the at least one detection element to output a measurement signal; and
a controller portion configured to:
provide a signal which indicates that the measuring probe is to operate with a first update rate during at least part of a moving mode, wherein the moving mode comprises at least one of a movement of the measuring probe such that the contact portion is moved away from the workpiece or a movement of the measuring probe such that the contact portion is moved at a distance from the workpiece that is equal to or greater than a threshold distance; and
provide a signal which indicates that the measuring probe is to operate with a second update rate during at least part of a measuring mode, wherein the measuring mode comprises a movement of the measuring probe such that the contact portion is moved toward the workpiece for obtaining a measurement, and the second update rate is faster than the first update rate.

19. The measuring system of claim 18, wherein a determination that a transition is to occur from the first update rate to the second update rate is based at least in part on a transition of a mode signal.

20. The measuring system of claim 19, wherein the moving mode and the measuring mode correspond to modes of a coordinate measuring machine which operates to move the measuring probe including the contact portion in relation to the workpiece, and a transition of the mode signal is related to a transition between the moving mode and the measuring mode.

\* \* \* \* \*